United States Patent [19]
Larson et al.

[11] Patent Number: 5,760,780
[45] Date of Patent: Jun. 2, 1998

[54] COMPUTER GRAPHICS SYSTEM USING CACHING OF PIXEL Z VALUES TO IMPROVE RENDERING PERFORMANCE

[75] Inventors: Ronald D. Larson, Fort Collins, Colo.; Charles R. Dowdell, Nashua, N.H.

[73] Assignee: Hewlett-Packard Company, Palo Alto, Calif.

[21] Appl. No.: 594,191

[22] Filed: Jan. 31, 1996

[51] Int. Cl.[6] .................................................. G06T 15/40
[52] U.S. Cl. ................................................ 345/422; 345/515
[58] Field of Search ............................. 395/122, 509, 395/515; 345/200

[56] References Cited

U.S. PATENT DOCUMENTS

| | | | |
|---|---|---|---|
| 4,965,751 | 10/1990 | Thayer et al. | 345/200 |
| 5,301,263 | 4/1994 | Dowdell | 395/122 |

*Primary Examiner*—Mark K. Zimmerman

[57] ABSTRACT

A computer graphics system utilizes caching of pixel Z values to improve rendering performance. Apparatus for updating the Z values corresponding to pixels of a computer graphics display includes a memory for storing current Z values representing depths at corresponding pixel locations, a Z cache for storing a subset of the current Z values which are stored in the memory, and a comparator for comparing a new Z value with a corresponding current Z value and indicating a pass when the new Z value satisfies a predetermined criteria. The current Z value is read from the Z cache when the current Z value is stored in the Z cache and is read from the memory when the current Z value is not stored in the Z cache. The new Z value is written into the Z cache when the comparator indicates a pass. Each cache entry preferably includes a tile of current Z values corresponding to pixels having a predefined relationship. Different tile configurations may be selected for optimum rendering performance.

15 Claims, 13 Drawing Sheets

COMPUTER GRAPHICS SYSTEM USING CACHING OF PIXEL Z VALUES TO IMPROVE RENDERING PERFORMANCE

FIELD OF THE INVENTION

This invention relates to computer graphics systems and, more particularly, to computer graphics systems which utilize caching of pixel Z values in connection with updating a Z buffer memory.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional object to be rendered are defined by a host computer in terms of primitive data. For example, when the primitive is a triangle, the host computer may define the primitive in terms of the X, Y and Z coordinates of its vertices, as well as the red, green and blue (R, G and B) color values of each vertex. Additional primitive data may be used in specific applications. Rendering hardware interpolates the primitive data to compute the display screen pixels that represent each primitive, and the R, G and B color values for each pixel.

The basic components of a computer graphics system may include a geometry engine, or geometry accelerator, a rasterizer and a frame buffer. The system may also include texture mapping hardware. The geometry accelerator receives from the host computer primitive data which defines the primitives that make up the view to be displayed. The geometry accelerator performs transformations on the primitive data, decomposes quadrilaterals into triangles, and performs lighting, clipping and plane equation calculations for each primitive. The output of the geometry accelerator is rendering data used by the rasterizer and the texture mapping hardware to generate final coordinate and color data for each pixel in each primitive. The pixel data from the rasterizer and the pixel data from the texture mapping hardware, if available, are combined and stored in the frame buffer for display on the video display screen.

In order to draw objects on the display screen that obscure each other (i.e. where one object is located in front of and therefore blocks the view of all or part of another object), the Z axis is utilized. The Z axis is perpendicular to the plane of the display screen and, by convention, has values that increase with distance from the observer. Each pixel is associated with a Z value that indicates the depth of the object to be drawn at that pixel location. The Z value, which may be represented, for example, by a 24 bit binary number, is stored in a Z buffer memory. Thus, R, G and B color values, and depth, or Z value, of the object to be drawn are associated with each pixel. The Z buffer memory contains a current Z value for each pixel on the display screen.

Typically, the displayed image changes with time, either with the entire image being replaced by another image so that a sequence of images is displayed, or with only certain pixels changing. When an object is to be added to an existing image, the image is updated as follows. First, a Z value which corresponds to the image existing on the screen (the current Z value) is read from the Z buffer memory. The current Z value is then compared with the Z value corresponding to the object to be added (the new Z value). If the new Z value is less than the current Z value, indicating that the object to be drawn is in front of the existing image at that pixel location, then the new Z value is written to the Z buffer memory and replaces the current Z value. In addition, the new color values are drawn on the screen at that pixel location. If the new Z value is greater than the current Z value, indicating that the new object is behind the existing image at that pixel location, then the current Z value remains in memory, and the new Z value is discarded. The new color values are not drawn on the screen. Finally, if the two Z values are equal, then the new color values may or may not be drawn on the screen, depending on a predetermined convention. Thus, in general, a three step process is carried out in updating a pixel location: reading the Z buffer memory, comparing the current and new Z values and, if the new Z value passes the comparison, writing the new value to the memory.

In computer graphics systems, the desired display is achieved only when the updating operation is carried out at high speed. Defining the bandwidth of a memory device as the number of bits per unit time that can be processed by the memory, it is desirable to have as high a bandwidth as possible. The Z value for each pixel may be represented by a 24 bit binary number, including a high order byte, a middle order byte and a low order byte. Thus, when a Z value is replaced in the Z buffer memory, six bytes are accessed in the Z buffer memory (three reads and three writes).

A technique for increasing the bandwidth of Z buffer memory operation is disclosed in U.S. Pat. No. 5,301,263 issued Apr. 5, 1994 to Dowdell. The high order byte is read from memory and is compared with the high byte of the new Z value. If the compare passes (new Z value is less than current Z value), the three bytes of the new Z value are written to the Z buffer memory. If the compare fails, the new Z value is discarded. If the new high byte is equal to the current high byte, the middle byte is read from memory and is compared with the new middle byte. The process used for the high bytes is repeated for the middle bytes and, if necessary, the low bytes. Using this technique, no more than four memory accesses are required. While the disclosed technique provides a significant improvement in performance, the need exists for additional improvements in performance.

SUMMARY OF THE INVENTION

In accordance with the invention, apparatus for updating the Z values corresponding to pixels of a computer graphics display is provided. The apparatus comprises a memory for storing current Z values representing depths at corresponding pixel locations, a Z cache for storing a subset of the current Z values which are stored in the memory, a comparator for comparing a new Z value with a corresponding current Z value and for indicating a pass when the new Z value satisfies a predetermined criteria, and control logic for controlling operation. The control logic, in response to a new Z address corresponding to the new Z value, reads the current Z value from the Z cache when the current Z value is stored in the Z cache and reads the current Z value from the memory when the current Z value is not stored in the Z cache. The new and current Z values are supplied to the comparator. The new Z value is written to the Z cache in response to the comparator indicating a pass.

Preferably, the Z cache includes a predetermined number of cache entries and an ID representative of a memory address corresponding to each of the cache entries. Each of the cache entries preferably includes locations for storing a tile of the current Z values. The tile comprises several Z values corresponding to different pixels. The control logic may include logic for selecting a tile configuration from a group of two or more tile configurations. In a preferred embodiment, a 4×1 tile configuration or a 2×2 tile configuration may be selected to optimize rendering performance.

Preferably, the new Z value and the current Z value each comprise an H byte, an M byte and an L byte. The Z cache preferably comprises an H byte cache, an M byte cache and an L byte cache. Each of the data entries in the Z cache comprise one entry in each of the H byte, M byte and L bytes caches. The comparator preferably comprises an H byte comparator, an M byte comparator and an L byte comparator.

According to another aspect of the invention, a method for updating Z values in a computer graphics system comprising a memory for storing current Z values and a comparator for comparing a new Z value with a corresponding current Z value is provided. The method comprises the steps of providing a Z cache for storing a subset of the current Z values which are stored in the memory, reading the current Z value from the Z cache when the current Z value is stored in the Z cache, reading the current Z value from the memory when the current Z value is not stored in the Z cache, supplying the new Z value and the current Z value to the comparator, comparing the new Z value with the current Z value and indicating a pass when the new Z value satisfies a predetermined criteria, and writing the new Z value to the Z cache in response to the comparator indicating a pass.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
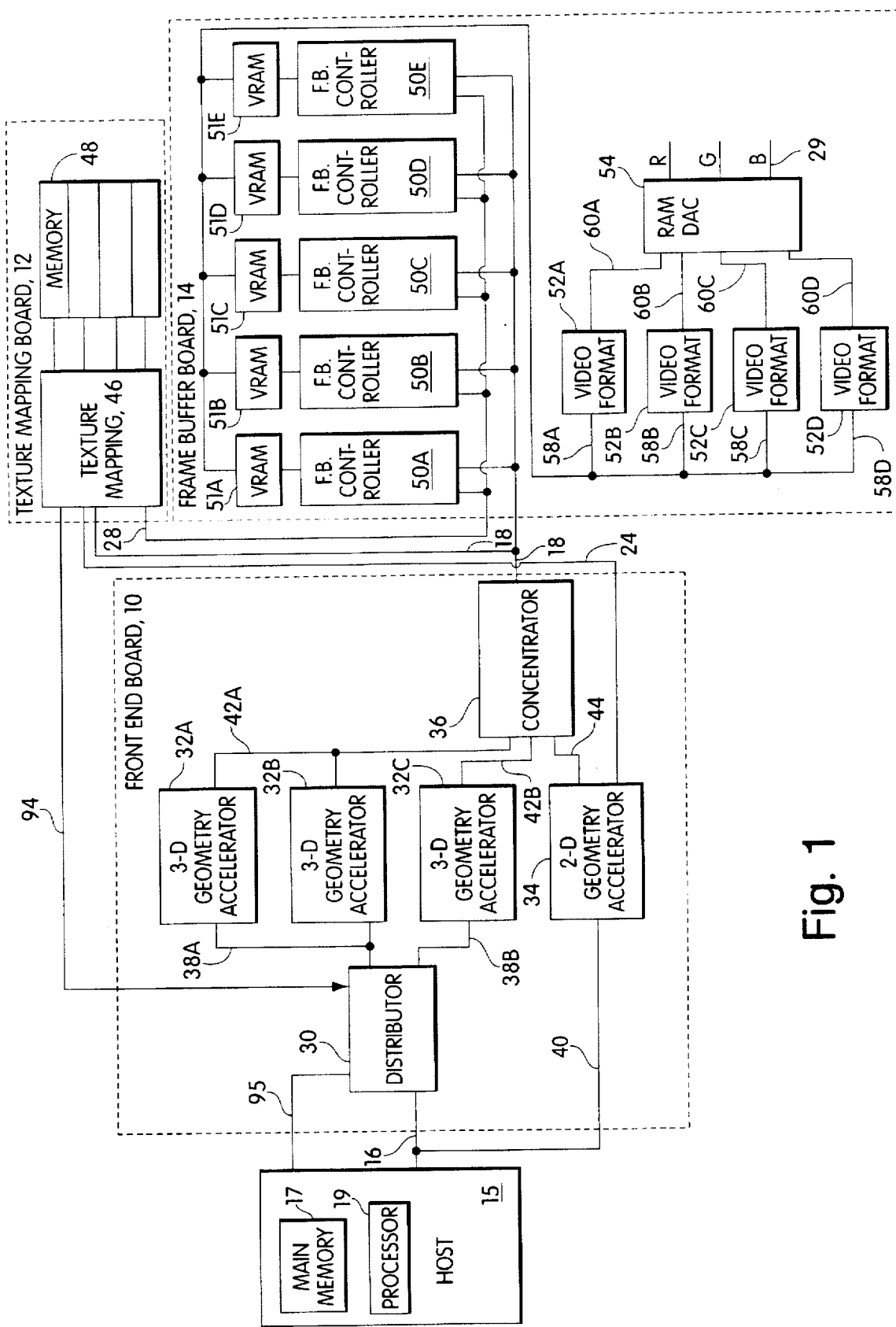
FIG. 1 is a block diagram of a first embodiment of a computer graphics system incorporating the present invention.

FIG. 1 is a block diagram of a first embodiment of a computer graphics system suitable for incorporation of the present invention. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by X,Y,Z coordinate data, R, G and B color data, alpha, normals and texture S,T coordinates for portions of the primitives, such as for the vertices when the primitive is a triangle.

Data representing the primitives in three dimensions then is provided by the front end board 10 to the texture mapping board 12 and the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor chip 30, 3 three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C.

Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the X,Y,Z coordinates that define the primitives received into corresponding screen space coordinates, determines object R,G,B values and texture S,T values for the screen space coordinates, decomposes quadrilaterals into triangles, calculates partial slope information, performs lighting calculations and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Relevant operations performed by each 3-D geometry accelerator chip are described in more detail below. Output data from the 3-D geometry accelerator chips 32A, 32B and 32C respectively is provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the cache memory is formed from a plurality of SDRAM (synchronous dynamic random access memory) chips. The cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include lines and triangles. The texture mapping board does not perform texture mapping of points or lines, and operates only upon triangle primitives. The data representing the triangle primitives includes the X,Y,Z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the X,Y pixel coordinates to calculate S and T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple pixels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A, 50B, 50C, 50D and 50E are respectively coupled to groups of associated VRAM (video random access memory) chips 51A–E. The frame buffer board may further include four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided over bus 18.

A Z value processing unit determines whether objects to be displayed are partially or fully blocked by other objects that are closer to the observer. The VRAM chips store a Z value for each pixel on the display screen.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 2:
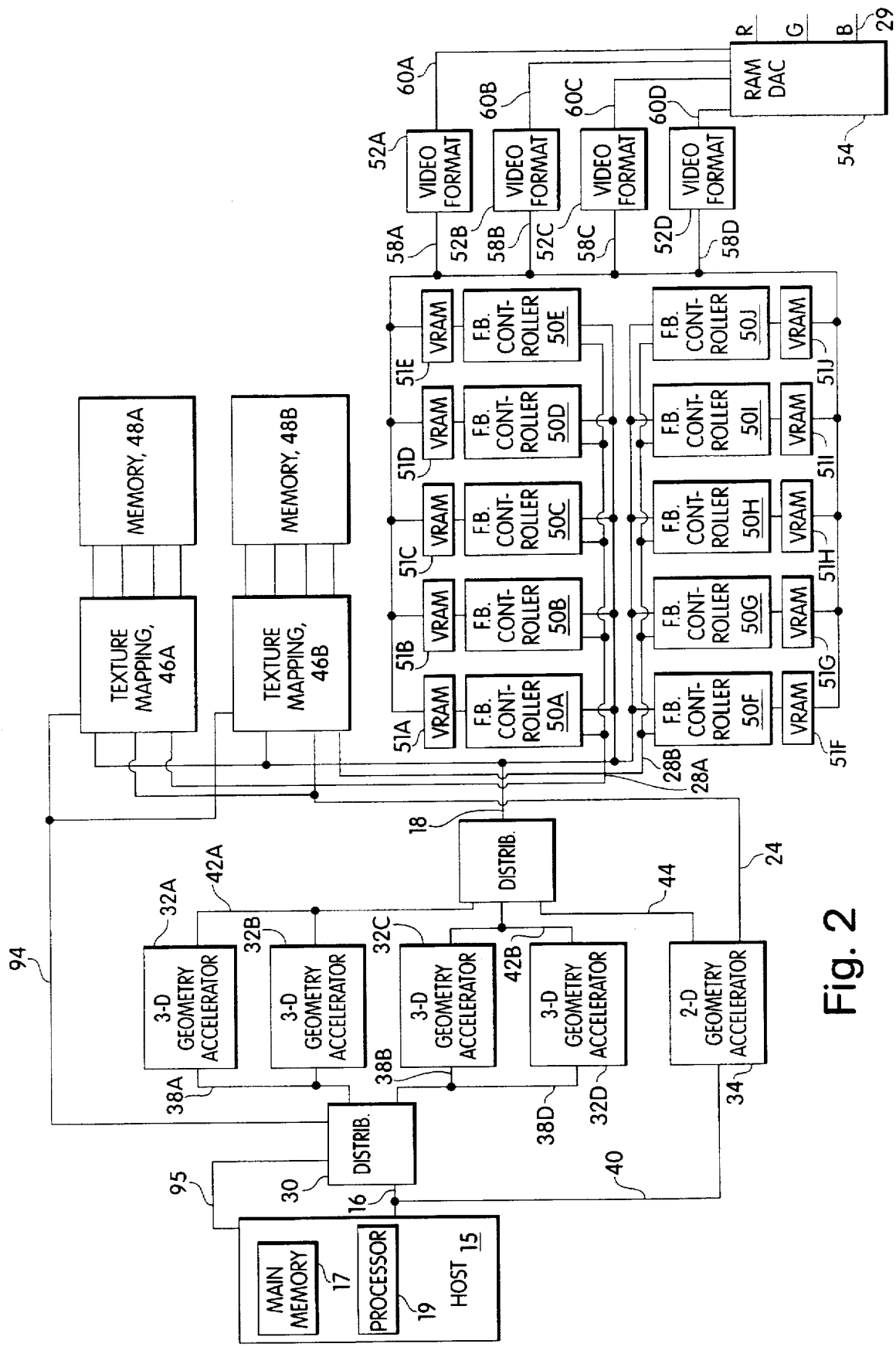
FIG. 2 is a block diagram of a second embodiment of a computer graphics system incorporating the present invention.

In one embodiment, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerator chips 32A, 32B, 32C and 32D, two texture mapping chips 46A and 46B respectively associated with cache memories 48A and 48B, and ten frame buffer controller chips 50A–50J, each with an associated group of VRAM chips. The operation of the system of FIG. 2 is similar to that of the system of FIG. 1, described above. The replication of the hardware in the embodiment of FIG. 2 allows for increased system bandwidth because certain primitive rendering operations can be performed in parallel on multiple primitives.

Figure 3:
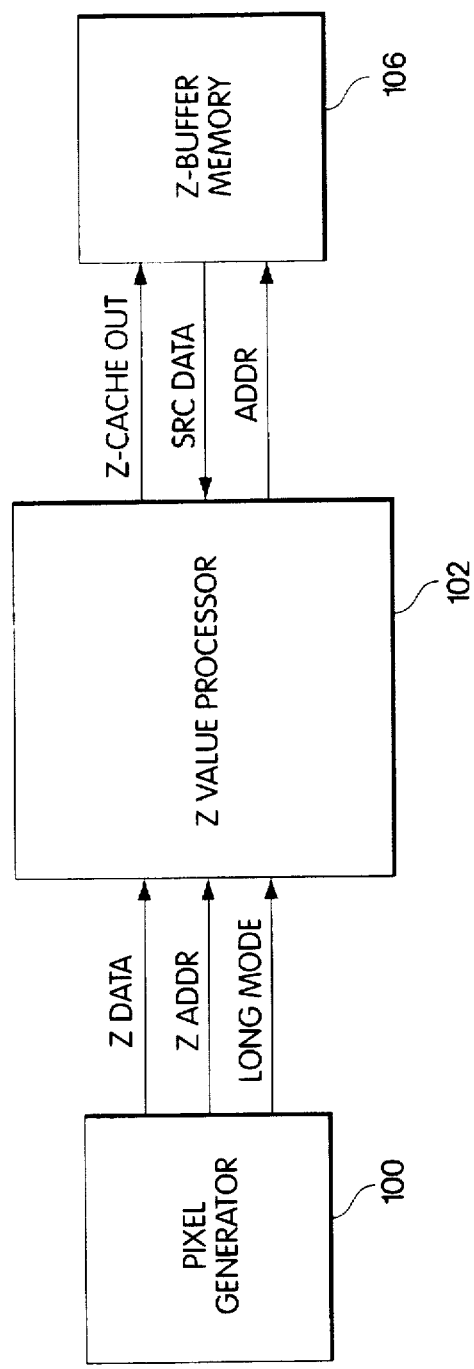
FIG. 3 is a simplified block diagram of a Z value processing unit in accordance with the present invention.

A simplified block diagram of a Z value processing unit in accordance with the present invention is shown in FIG. 3. A pixel generator 100 supplies new Z values (ZDATA) and new Z addresses (ZADDR) for pixels of objects being rendered to a Z value processor 102. The pixel generator 100 also generates R, G and B color values (not shown in FIG. 3) for each pixel of an object being rendered. The Z value processor supplies addresses (ADDR) and data (ZCACHE OUT) to a Z buffer memory 106. The Z buffer memory 106 supplies current Z values (SRC DATA) to the Z value processor 102. Preferably, the ZCACHE OUT data is supplied to the Z buffer memory 106 and the SRC DATA is supplied to the Z value processor 102 on a bidirectional data bus interconnecting the Z value processor 102 and the Z buffer memory 106. With reference to FIGS. 1 and 2, the pixel generator 100 and the Z value processor 102 are part of each frame buffer controller. The Z buffer memory 106 is part of each VRAM chip. In general, the Z buffer memory 106 stores Z values for each pixel in the display screen. The Z value processor 102 controls reading and writing of Z values in the Z buffer memory 106 and controls comparison of new Z values received from the pixel generator 100 with current Z values stored in the Z buffer memory 106. Based on the result of the comparison, the new Z value may be used to update the Z buffer memory or may be discarded. As described below, the Z value processor 102 includes a Z cache which provides improved performance.

Each Z value is preferably represented by three bytes of 8 bits each for a total of 24 bits. The three bytes are designated a high (H) byte, a middle (M) byte and a low (L) byte. It will be understood that different numbers of bits and different numbers of bytes may be used to represent Z values in accordance with the invention.

Figure 4:
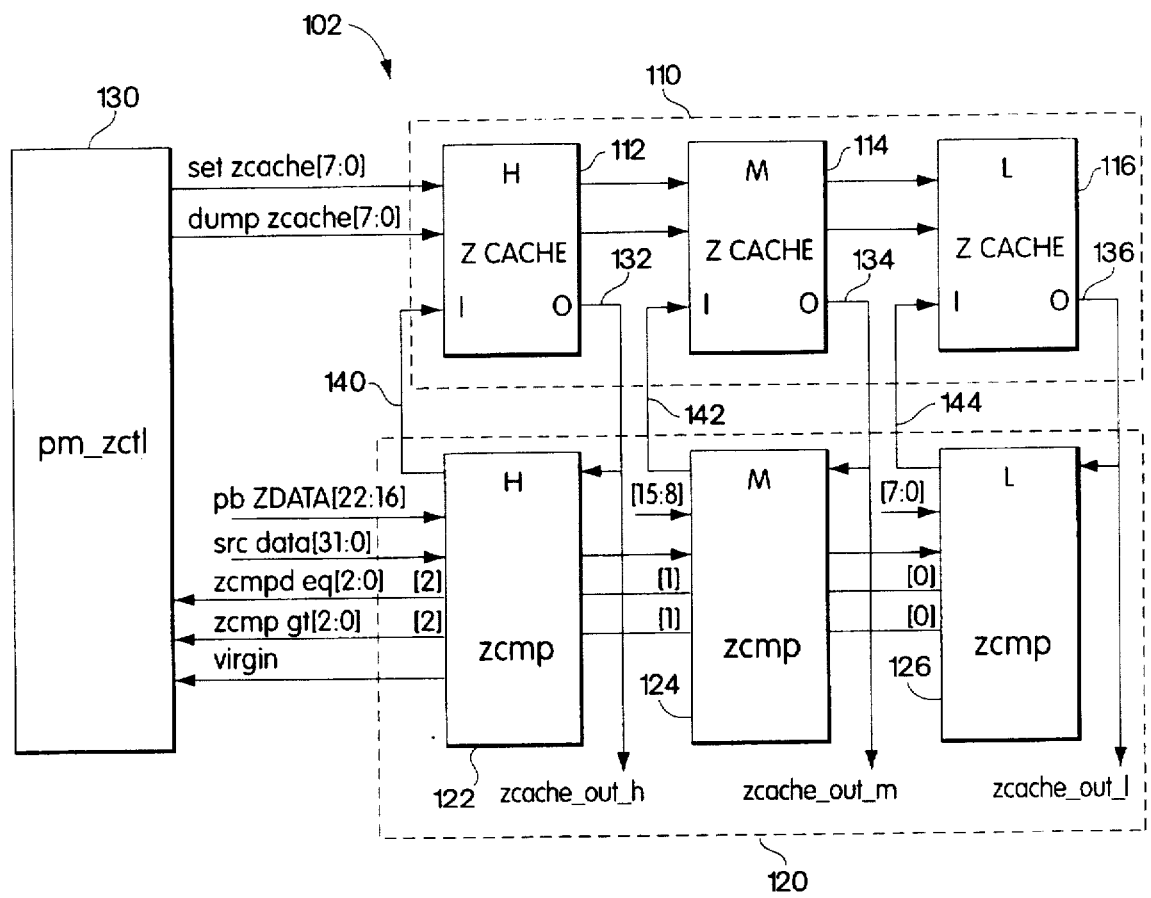
FIG. 4 is a block diagram of the Z value processor shown in FIG. 3.

A simplified block diagram of the Z value processor 102 is shown in FIG. 4. A Z cache 110 includes an H byte cache 112, an M byte cache 114 and an L byte cache 116. As described below, each section of Z cache 110 preferably has eight locations of four bytes each. A Z comparator 120 includes an H byte comparator 122, an M byte comparator 124 and an L byte comparator 126. The H byte cache 112 operates with the H byte comparator 122; the M byte cache 114 operates with the M byte comparator 124; and the L byte cache 116 operates with the L byte comparator 126. The Z cache 110 and the comparator 120 are controlled by control logic 130.

In the embodiment of FIG. 4, write address lines (SET Z CACHE [7:0]) are connected between control logic 130 and high byte cache 112, M byte cache 114 and L byte cache 116. Similarly, read address lines (DUMP ZCACHE [7:0]) are connected between control logic 130 and H byte cache 112, M byte cache 114 and L byte cache 116. The embodiment of FIG. 4 uses one address line for each cache entry. It will be understood that any suitable addressing technique may be utilized. The data output (ZCACHE OUT) of each cache is connected to the corresponding comparator and is supplied to the Z buffer memory 106. Thus, ZCACHE OUT H is supplied by H byte cache 112 to H byte comparator 122 on bus 132; ZCACHE OUT M is supplied by M byte cache 114 to M byte comparator 124 on bus 134; and ZCACHE OUT L is supplied by L byte cache 116 to L byte comparator 126 on bus 136. New Z values are supplied to comparators 122, 124 and 126. In particular, H bytes (ZDATA[22:16]) are supplied to H byte comparator 122, M bytes (ZDATA[15:8]) are supplied to M byte comparator 124 and L bytes (ZDATA [7:0]) are supplied to L byte comparator 126. Current data from Z buffer memory 106 (SRC DATA [31:0]) is supplied to each of comparators 122, 124 and 126. As indicated above, the ZCACHE OUT data and the SRC DATA are preferably transmitted on a bidirectional data bus interconnecting the Z value processor 102 and the Z buffer memory 106. As described below, a tile of four H bytes, four M bytes or four L bytes is read from Z buffer memory 106 in a single access. Compare results from each of the comparators 122, 124 and 126 are supplied to control logic 130. As described below, each comparator determines whether the bytes being compared are equal and also determines whether one byte is greater than the other. Each comparator also provides a data output to the corresponding cache. Thus, comparator 122 writes H bytes to H byte cache 112 on bus 140; M byte comparator 124 writes M bytes to M byte cache 114 on bus 142; and L byte comparator 126 writes L bytes to L byte cache 116 on bus 144. As described below, the bytes written to Z cache 110 may be new values or may be current values read from Z buffer memory 106, depending on the results of the compare operation.

Figure 5:
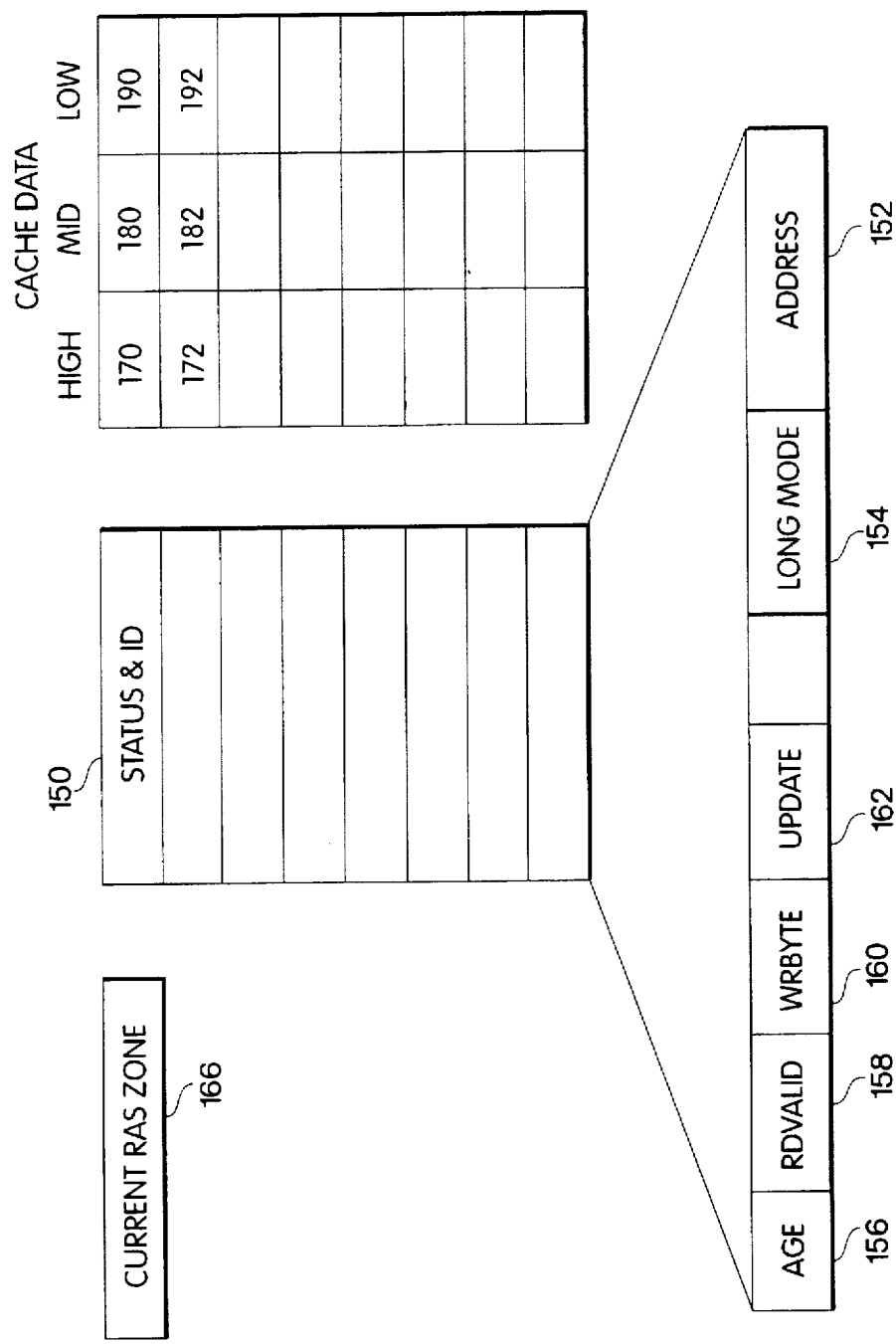
FIG. 5 illustrates the organization of the Z cache shown in FIG. 4.

A preferred organization of Z cache is illustrated in FIG. 5. The cache data is organized as eight H byte tile locations 170, 172, etc. in H byte cache 112; eight M byte tile locations 180, 182, etc. in M byte cache 114; and eight L byte tile locations 190, 192 etc. in L byte cache 116. Each location preferably stores a tile of four bytes corresponding to four different pixels. As described below, the tile may have a 4×1 configuration, wherein each pixel is located on one scan line of the display screen, or a 2×2 configuration, wherein the pixels in the tile are located on two consecutive scan lines of the screen display. The tile configuration is selectable. Corresponding H, M and L byte tile locations constitute a cache data entry. Thus, for example, tile locations 170, 180 and 190 in FIG. 5 constitute a single cache entry which is addressable by the read address and write address lines. The example of FIG. 5 has eight cache entries. Because each tile location stores a tile of four bytes, the cache input buses 140, 142 and 144 (FIG. 4) and the cache output buses 132, 134 and 136 are each 32 bits wide.

A status and ID field is associated with each corresponding cache data entry. An ID field 152 contains the address of the corresponding cache data entry. The ID field specifies a pixel address and scan line. A long mode bit 154 controls whether the tile has a 4×1 configuration or a 2×2 configuration. A status field includes subfields which indicate the status of each cache data entry. An age field 156 indicates the age of the cache data entry. The age field is initially set to 0 and then is incremented each time a different entry is loaded. A larger age indicates an older entry. A read valid field 158 (RD Valid [2:0]) has bits which are set when Z data is loaded from the Z buffer memory. The three bits indicate valid data for each byte. The read valid bits are all set to 0 at reset or when moving to a different memory page. A write valid field 160 (WR Byte [2:0]) has bits which are set when Z data is loaded from the pixel generator. These bits control which bytes are written back into the Z buffer memory. The three bits indicate valid data for each byte. An update field 162 (Update [3:0]) has bits which are set when the corresponding Z value in the Z cache is updated by the pixel generator. Each bit in the update field corresponds to one Z value stored in the cache. When the pixel generator updates one of the four Z values in the cache, the corresponding bit is set in the update field. This allows more Z data, such as M or L bytes, without overriding existing Z data written by the pixel generator. A Current RAS Zone field 166 indicates the page in the Z buffer memory 106 corresponding the Z cache data. When a page boundary is crossed, the Z cache 110 is flushed and all entries are written to the Z buffer memory 106. In a preferred implementation, the status and ID fields and the Current RAS Zone are stored in control logic 130.

Figure 6:
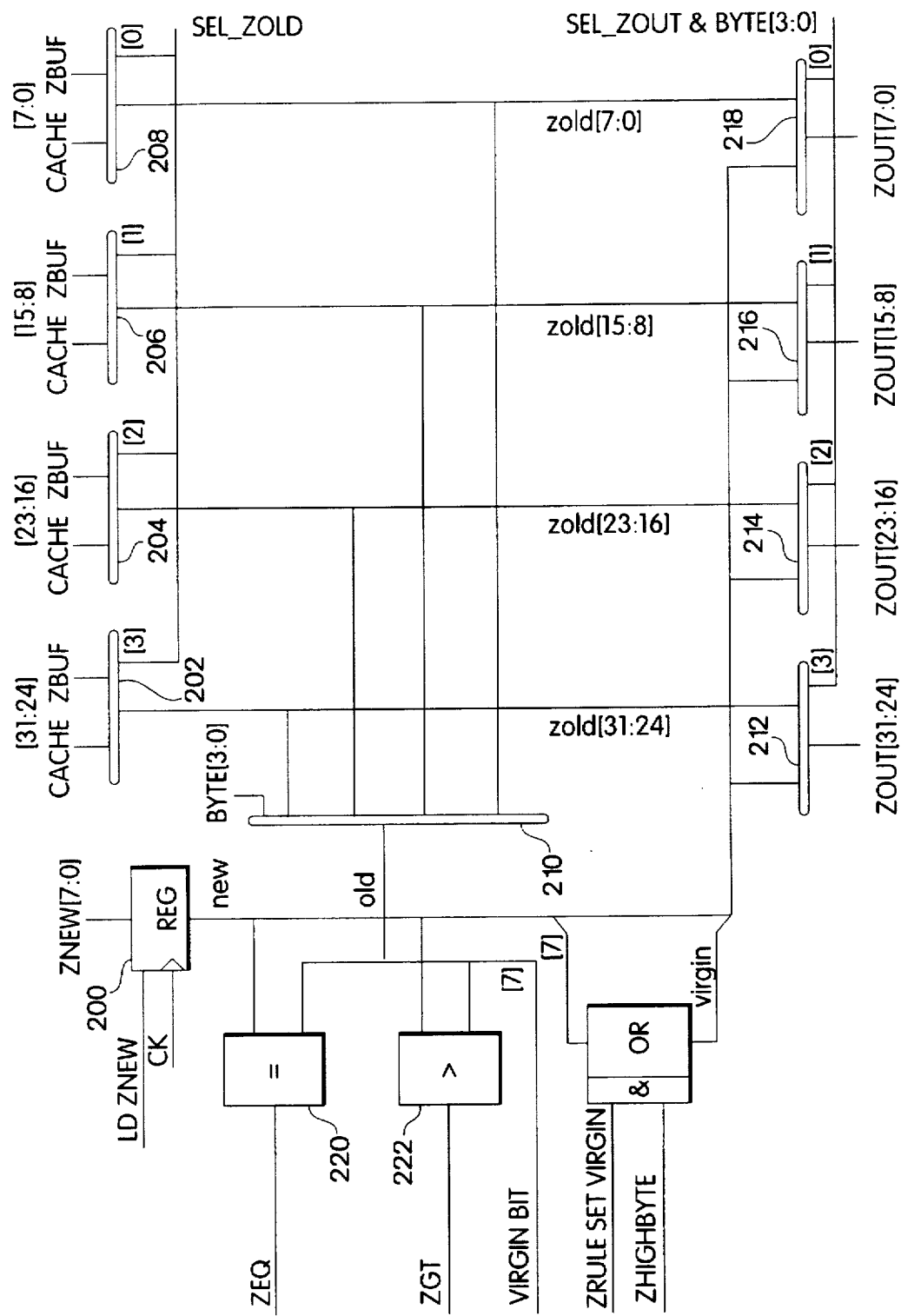
FIG. 6 is a block diagram representative of each Z comparator shown in FIG. 4.

A block diagram representative of each of the comparators 122, 124 and 126 is shown in FIG. 6. A byte of a new Z value to be compared is placed in a register 200. As described below, the new Z value is compared with the corresponding cache Z value when a cache hit occurs, and is compared with the corresponding Z buffer value when a cache miss occurs. The selection of cache data or Z buffer data is made by multiplexers 202, 204 and 206 and 208. A cache byte and a corresponding Z buffer byte are supplied to the two inputs of each of the multiplexers 202, 204, 206 and 208. A select line (SEL ZOLD) is connected to multiplexers 202, 204, 206 and 208 and selects either the cache data or the Z buffer data. The outputs of multiplexers 202, 204, 206 and 208 are supplied to respective inputs of a multiplexer 210 and to first inputs of multiplexers 212, 214, 216 and 218, respectively. The output of multiplexer 210 is supplied to one input of an equal-to comparator 220 and to one input of a greater-than comparator 222. The multiplexer 210 is controlled by a byte select signal which selects one of the four bytes in the tile for comparison with the new Z data. The byte select signal is derived from the two low order bits of the new Z address. The output of register 200, representing one byte of the new Z value, is supplied to a second input of equal to comparator 220, to a second input of greater-than comparator 222 and to second inputs of multiplexers 212, 214, 216 and 218. An output ZEQ of comparator 220 indicates that the new and current bytes of the Z value are equal. An output ZGT of comparator 222 indicates that the byte of the new Z value is greater than the byte of the current Z value. The multiplexers 212, 214, 216 and 218 supply four bytes of a tile for writing into, the Z cache 110 on bus 140, 142 or 144.

The operation of the Z value processing unit of the present invention is described with reference to the flow diagrams of FIGS. 7A to 7F. The steps illustrated in FIGS. 7A to 7F are executed by control logic 130 (FIG. 4) in combination with Z cache 110, comparator 120, Z buffer memory 106 and new Z information supplied by pixel generator 100. When a new Z value and the new Z address of the corresponding pixel are received in step 300, control logic 130 determines in step 302 whether the corresponding pixel is presently in Z cache 110. This determination is made by comparing the new Z address with the addresses of each of the ID fields 152 (FIG. 5) of Z cache 110. When one of the cache ID fields matches the new Z address, a cache hit occurs. When none of the cache ID fields matches the new Z address, a cache miss occurs, and data must be read from the Z buffer memory as described below. Since each cache entry contains a tile of four bytes corresponding to four different pixels, the two low order bits of the addresses are not compared. One of the four bytes is selected in the comparator using the two low order bits of the new Z address. When a cache hit occurs in step 302, the H byte of the new Z value is compared with the H byte of the corresponding cache entry in step 304. Step 304 is performed by the H byte comparator 122. With reference to FIG. 6, the two low order bits of the new Z address are used to generate the select signal for multiplexer 210 to thereby select the appropriate byte from the addressed cache tile. In step 306, the equal-to comparator 220 of H byte comparator 122 determines whether the H byte of the new Z value is equal to the H byte of the cache Z value. In step 308, the greater-than comparator 222 of H byte comparator 122 determines whether the H byte of the new Z value is greater than the H byte of the cache Z value. The condition wherein the byte of the new Z value is less than the byte of the current Z value is designated as a pass. When a pass occurs, indicating that the new Z value is closer to the observer than the current Z value, the H, M and L bytes of the new Z value are written into the corresponding entry in the Z cache 110, in step 310. In particular, with reference to FIG. 6, the appropriate multiplexer 212, 214, 216 or 218, as determined from the two low order bits of the new Z address, selects the byte of the new Z value for writing to the Z cache. This operation is performed in each of the comparators 122, 124 and 126. Thus, the new Z value has replaced the current Z value in Z cache 110, and the process is complete for that new Z value. When a pass is not indicated by the comparison in step 308, the new Z value is farther from the observer than the current Z value, and the new object is hidden. In this case, no replacement of the cache data is necessary, and the new Z value is discarded, thereby completing the process for that new Z value.

When the H byte of the new Z value is determined in step 306 to be equal to the H byte of the cache Z value, an update decision cannot be made on the basis of the H bytes, and comparison of the M bytes is necessary. The process proceeds to FIG. 7B. In step 320, control logic 130 determines whether a cache hit occurs for the M byte of the new Z value. Step 320 requires comparison of the new Z address with the cache addresses and further requires examination of the read valid and update status bits. The read valid bit for the addressed cache entry is tested to determine if the M byte has been read into the Z cache 110 from the Z buffer memory 106. The Z cache 110 may include a valid M byte if the update bit is set, even if the read valid bit is not set. Thus, a cache hit occurs for the M byte if the read valid bit or the update bit is set for the addressed cache entry. In the case of a cache hit on the M byte in step 320, the M byte of the new Z value is compared with the M byte of the cache Z value in step 322. The comparison of M bytes is performed by the M byte comparator 124 in the manner described above in connection with step 304. In step 324, the equal-to comparator 220 of M byte comparator 124 determines whether the new and current M bytes are equal. In step 326, the greater-than comparator 222 of M byte comparator 126 determines whether the M byte of the new Z value is greater than the M byte of the cache Z value.

When the M byte of the new Z value passes the comparison, the M and L bytes of the new Z value are written to the corresponding cache entry in step 328. When a pass is not indicated in step 326, the new Z value is discarded.

When the M byte of the new Z value and the M byte of the cache entry are determined in step 324 to be equal, an update decision cannot be made on the basis of the H and M bytes, and comparison of the L bytes is necessary. The process proceeds to FIG. 7C. In step 340, the control logic 130 determines whether a cache hit occurs for the L byte of the new Z value in the manner described above in connection with step 320. In the case of a cache hit on the L byte in step 340, the L byte of the new Z value is compared with the L byte of the cache Z value in step 342. The comparison is performed by the L byte comparator 126 in the manner described above in connection with step 304. In step 344, the equal-to comparator 220 of L byte comparator 126 determines whether the new and current L bytes are equal. In step 346, the greater-than comparator 222 of L byte comparator 126 determines whether the L byte of the new Z value is greater than the L byte of the cache Z value. When the L byte of the new Z value passes the comparison, the L byte of the new Z value is written into the corresponding cache entry in step 348. When the L byte of the new Z value does not pass the comparison, the new Z value is discarded.

When the new and current L bytes are determined in step 344 to be equal, the new and current Z values are equal on all bytes, and the new Z value is processed according to a predetermined update criteria in step 350. The update criteria depends on the application. In a first update criteria, the new Z value replaces the current Z value when the new Z value is less than the current Z value. When the new and current values are equal, that criteria is not satisfied, and the new Z value is discarded. In a second update criteria, the new Z value replaces the current Z value when the new Z value is equal to or less than the current Z value. When that criteria is utilized and the new and current Z values are equal, the new Z value replaces the current Z value.

Although this results in no change in the Z cache, the new color values are likely to be different from the current color values.

Figure 7A:
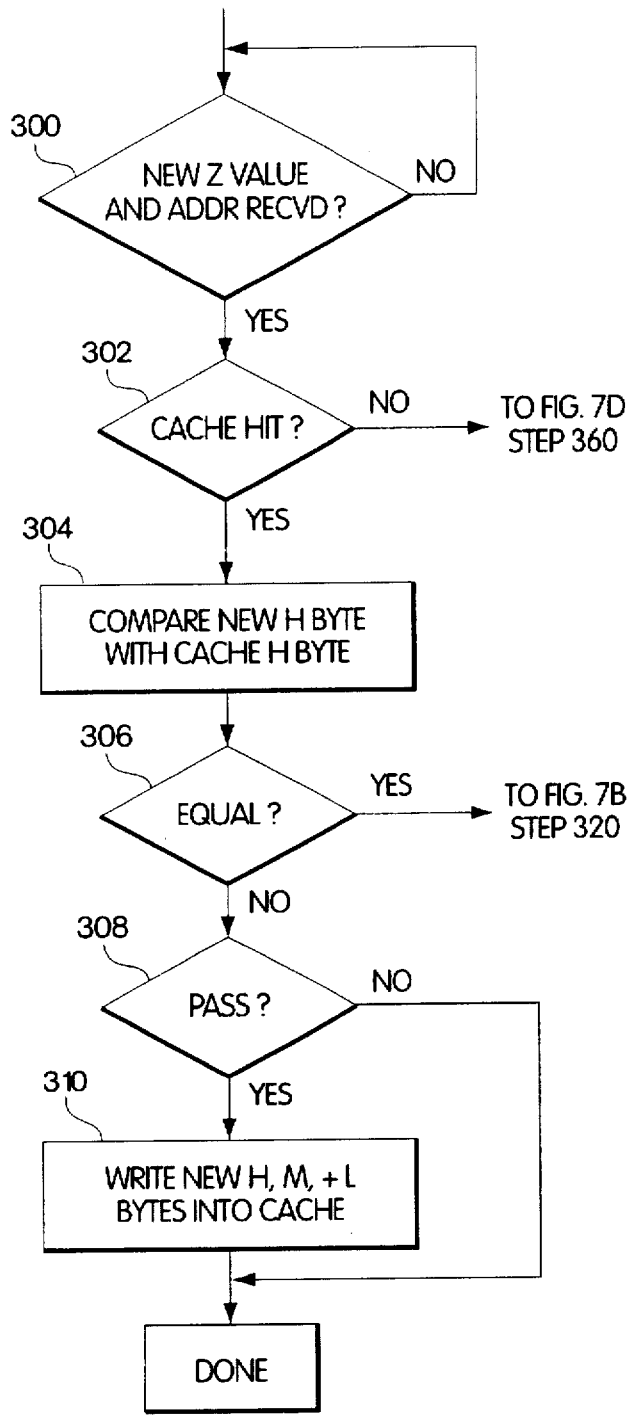
FIGS. 7A-7F are flow diagrams that illustrate operation of the Z value processing unit shown in FIGS. 3-6.
Figure 7B:
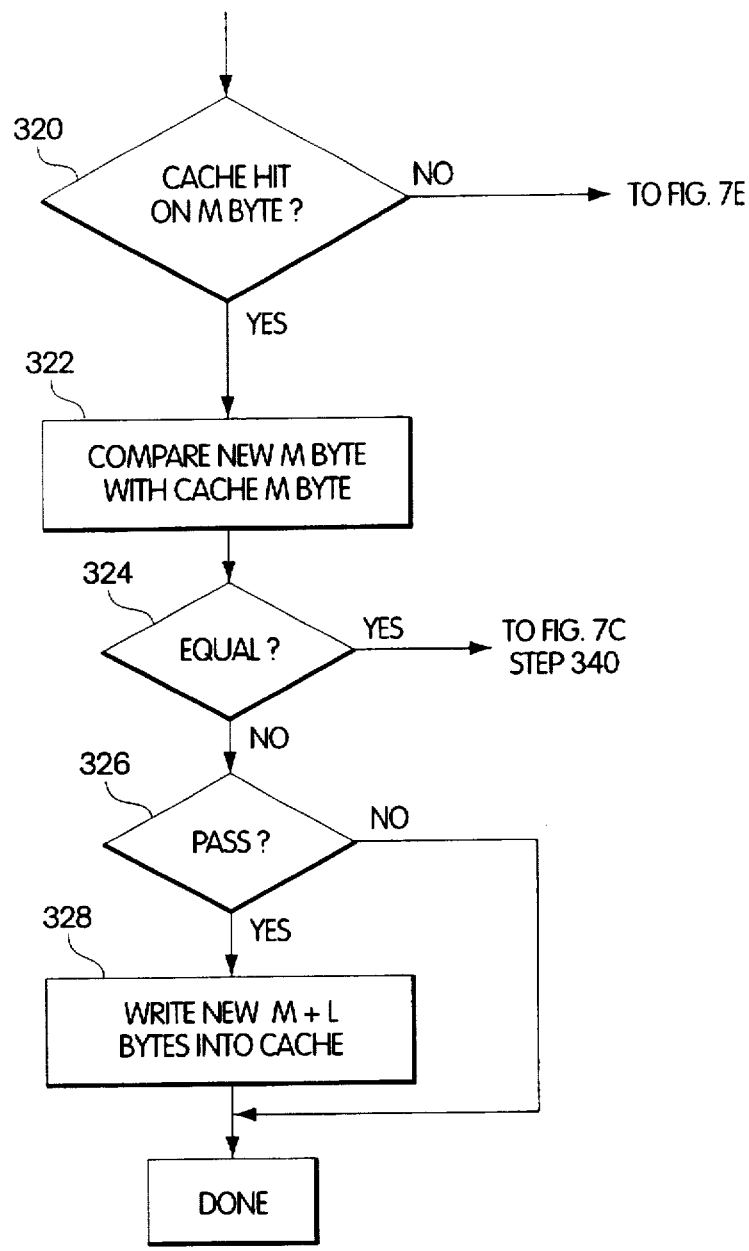
Figure 7C:
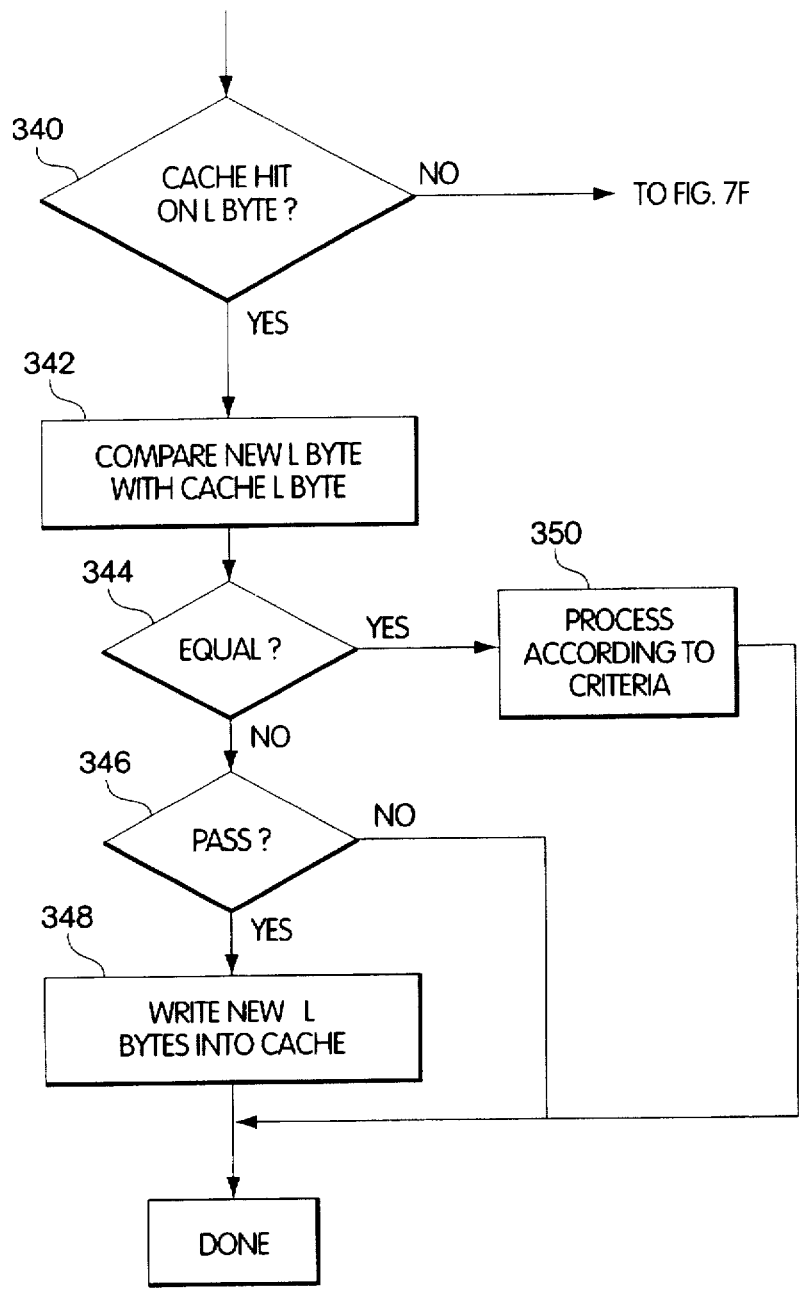
Figure 7D:
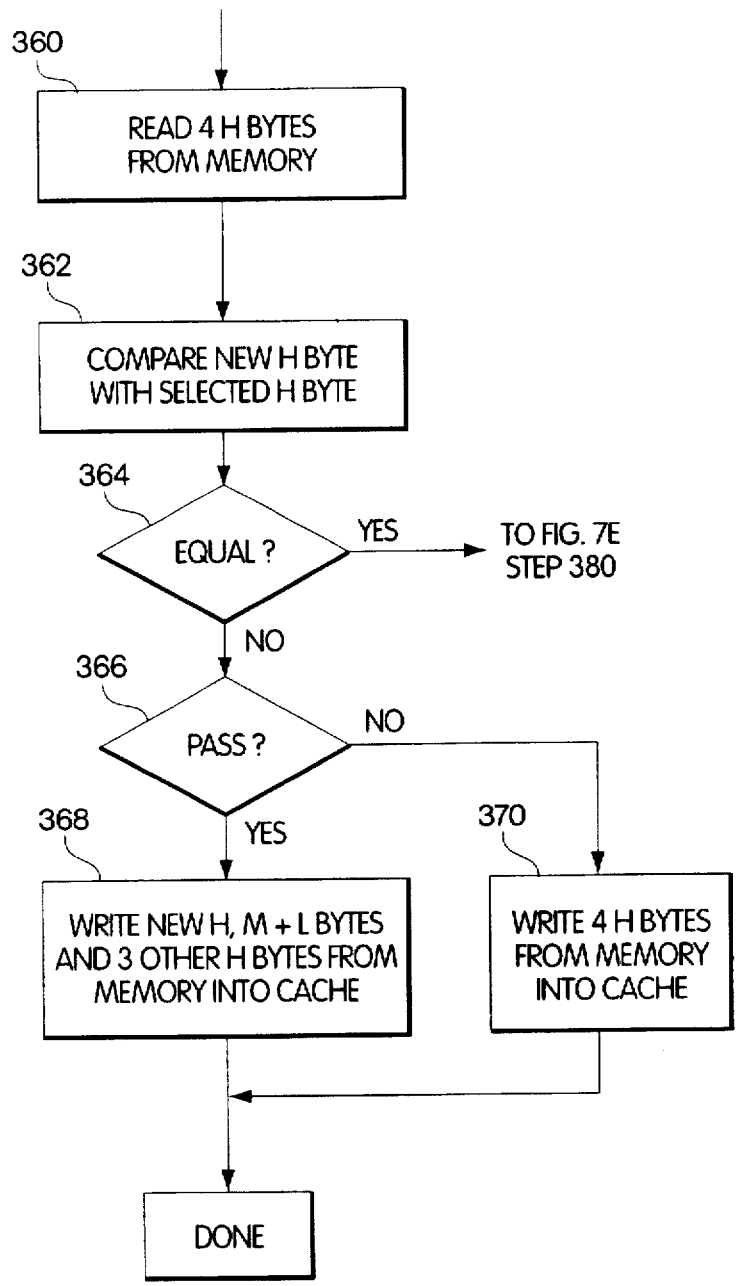

Referring again to FIG. 7A, when a cache miss occurs in step 302, the process proceeds to FIG. 7D. Since the current Z value is not present in the Z cache 110, the Z value for the pixel corresponding to the new Z value is read from the Z buffer memory 106 in step 360. In particular, the four H bytes of a tile corresponding to the new Z value are read from the Z buffer memory. As indicated above, the tile may have a 2×2 pixel configuration or a 4×1 pixel configuration. The four H bytes from the Z buffer memory are supplied to the H byte comparator 122. The comparator 122 selects one of the four H bytes from memory and compares the H byte of the new Z value with the selected H byte from memory in step 362. With reference to FIG. 6, the four H bytes from memory are input to the ZBUF inputs of multiplexers 202, 204, 206 and 208, respectively. The ZBUF inputs are selected, and the four H bytes are input to multiplexer 210. The two low order bits of the new Z address are used to generate a select signal for multiplexer 210. Multiplexer 210 selects the H byte corresponding to the pixel location of the new Z value. The selected H byte is supplied to comparators 220 and 222 for comparison with the H byte of the new Z value contained in register 200. In step 364, the equal-to comparator 220 of H byte comparator 122 determines if the H byte of the new Z value is equal to the selected H byte from memory. In step 366, the greater-than comparator 222 of H byte comparator 122 determines if the H byte of the new Z value is greater-than the selected H byte from memory. When the H byte of the new Z value passes the comparison in step 366, the H, M and L bytes of the new Z value are written to the Z cache 110 in step 368. In addition, the three other H bytes read from the Z buffer memory in step 360 but not selected in step 362 are written to the corresponding cache entry in the H byte cache 112 in step 368. The cache entry selected for writing in step 368 is an empty cache entry if the Z cache 110 is not full. If the Z cache 110 is full, an entry is selected based on the age field. The new data is written into the cache entry with the highest value in the age field. Before new data is written into the cache entry, any bytes having the write valid bit true are written back to the Z buffer memory. When the H byte of the new Z value does not pass the comparison in step 366, the four H bytes read from memory in step 360 are written into the Z cache 110 in step 370. A cache entry for writing the four H bytes is selected as described above in connection with step 368.

Figure 7E:
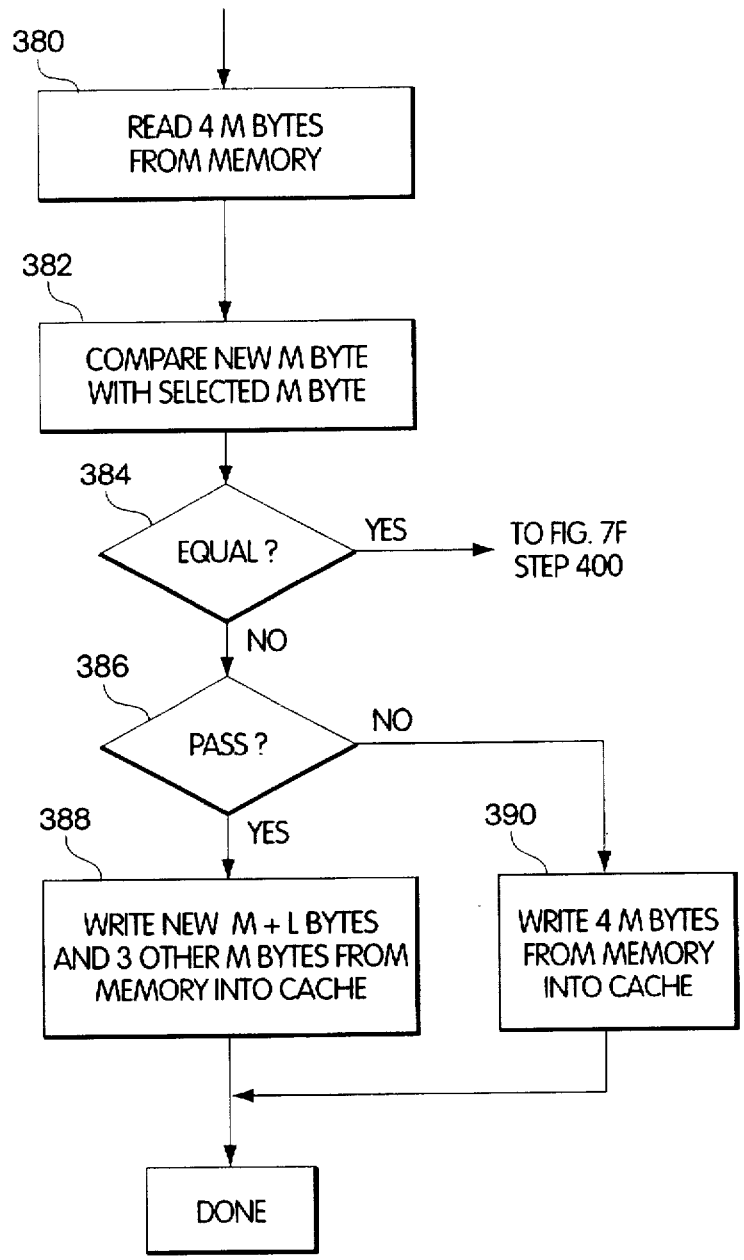

When the H byte of the new Z value is determined in step 364 to be equal to the selected H byte from memory, the process proceeds to FIG. 7E. In step 380, the four M bytes of the tile corresponding to the new Z address are read from memory. In step 382, the M byte of the new Z value is compared with a selected M byte of the four M bytes that were read from memory in step 380. The M byte selection and comparison operates in the manner described above in connection with the H byte comparison in step 362, except that the M byte comparator performs the selection and comparison. In step 384, the equal to comparator 220 of M byte comparator 124 determines whether the M byte of the new Z value is equal to the selected M byte from memory. In step 386, the greater than comparator 222 of M byte comparator 124 determines whether the M byte of the new Z value is greater than the selected M byte from memory. When the M byte of the new Z value passes the comparison in step 386, the M and L bytes of the new Z value are written to the Z cache 110 in step 388. In addition, the three other M bytes that were read from memory in step 380 but not selected in step 382 are written to the other three byte locations in the same cache entry in step 388. The cache entry for writing of data in step 388 is selected as described above in connection with step 368. If the M byte of the new Z value does not pass the comparison in step 386, the four M bytes read from memory in step 380 are written into the Z cache 110 in step 390. The cache entry for writing in step 390 is selected as described above in connection with step 368.

Figure 7F:
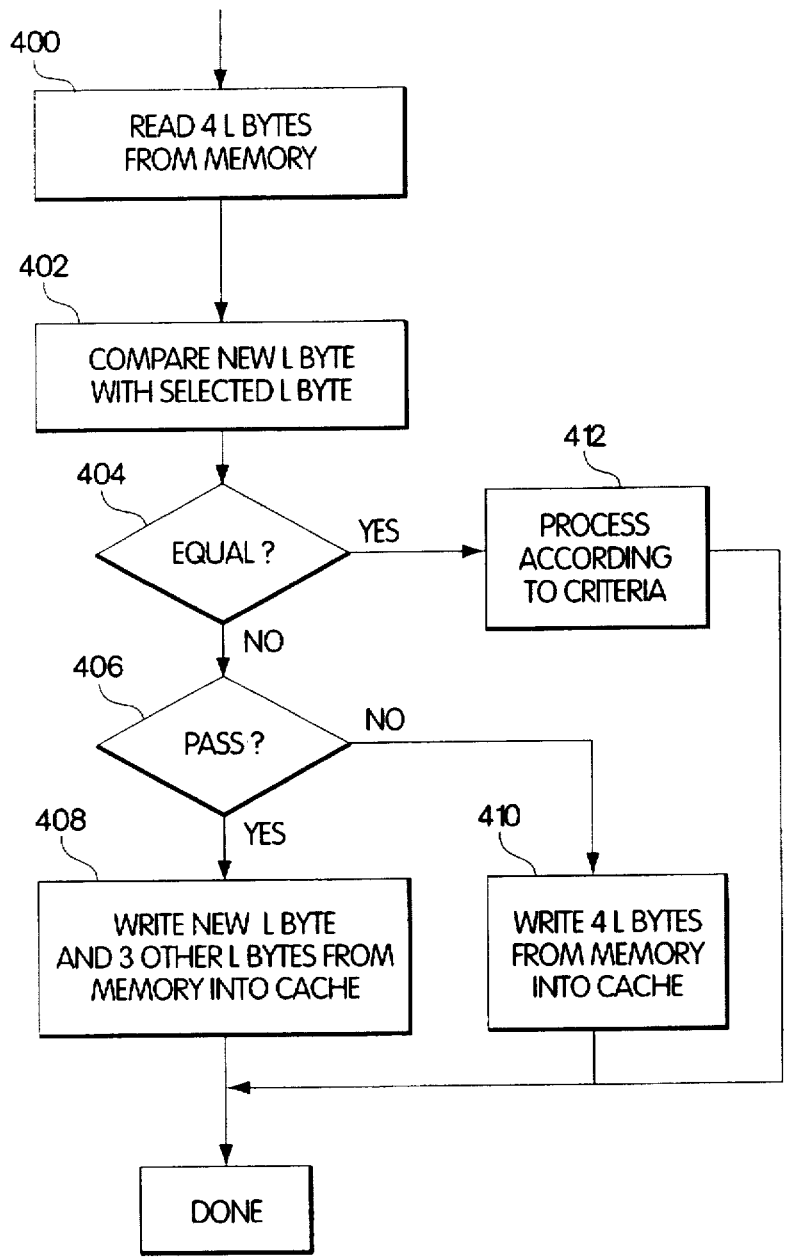

When the M byte of the new Z value is determined in step 384 to be equal to the selected M byte from memory, the process proceeds to FIG. 7F. In step 400, the four L bytes in the tile corresponding to the new Z address are read from memory. The L byte of the new Z value is compared with a selected one of the four L bytes from memory in step 402. The two low order bits of the new Z address are used to select one of the four L bytes from memory. The comparison of L bytes is performed by the L byte comparator 126 as described above in connection with step 362. In step 404, the equal-to comparator 220 of L byte comparator 126 determines if the L byte of the new Z value is equal to the selected L byte from memory. In step 406, the greater-than comparator 222 of L byte comparator 126 determines whether the L byte of the new Z value is greater than the selected L byte from memory. When the L byte of the new Z value passes the comparison in step 406, the L byte of the new Z value is written to the Z cache 110 in step 408. In addition, the three other L bytes read from memory in step 400 but not selected in step 402 are written into the same cache entry in step 408. The cache entry for writing in step 408 is selected as described above in connection with step 368. When the L byte of the new Z value does not pass the comparison in step 406, the four L bytes read from memory in step 400 are written into the Z cache 110 in step 410. The cache entry for writing in step 410 is selected as described above in connection with step 368. When the L byte of the new Z value is determined in step 404 to be equal to the selected L byte from memory, the new and current Z values are equal, and the new Z value is processed according to a predetermined criteria in step 412. The processing in step 412 can be the same as described above in connection with step 350.

Figure 8:
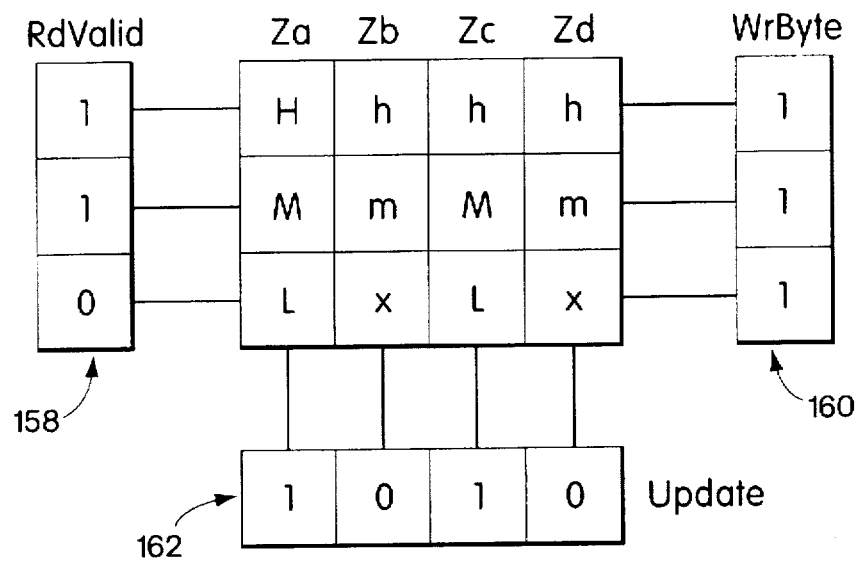
FIG. 8 shows an example of one Z cache entry and the corresponding status bits.

An example of an entry in Z cache 110 and the corresponding status bits are illustrated in FIG. 8. As indicated previously, each cache entry contains H, M and L bytes for a tile of four pixels. In the example of FIG. 8, the cache entry includes Z values Za, Zb, Zc and Zd. The h, m and l indicate data read from the Z buffer memory, while the H, M and L indicate new Z data updated from the pixel generator. The associated read valid field 158, write valid field 160 and update field 162 are shown. Bits in the read valid field are set when Z data is loaded from the Z buffer memory. Bits in the write valid field are set when the data is loaded from the pixel generator. When one of the Z values in the cache is updated by the pixel generator, the corresponding bit is set in the update field. In the example of FIG. 8, the H and M bytes have been read from memory and stored in the cache as shown by the read valid bits. The write valid field indicates that when this cache entry is flushed, all bytes must be written to the Z buffer memory. The update field shows that the values Za and Zc have been modified. This information is necessary in case the L byte is needed to resolve the comparison for Zb or Zd. When the L byte is read, the L bytes for Za and Zc will not be updated from the Z buffer memory since the data in the cache is newer than the Z buffer data.

Figure 9A:
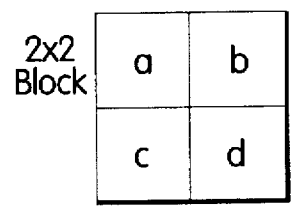
FIG. 9A and 9B show examples of tile configurations used in the Z cache.
Figure 9B:
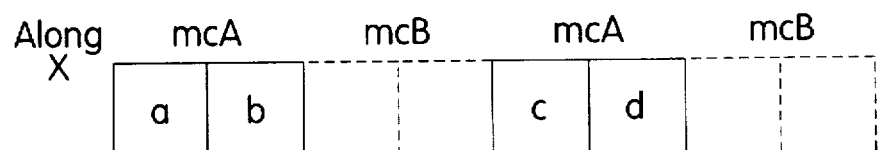

As indicated above, the tile configuration in the Z cache 110 is preferably programmable. This permits the tile configuration to be optimized for the graphics primitive being processed. In the example described above, a 2×2 tile configuration or a 4×1 configuration is utilized. The 2×2 tile configuration is illustrated in FIG. 9A, and the 4×1 tile configuration is illustrated in FIG. 9B. In the 2×2 tile configuration, pixels a and b are located on one scan line of the display screen, and pixels c and d are located on the next scan line of the display screen. Pixels a and b are located above pixels c and d, respectively. In the 4×1 tile configuration shown in FIG. 9B, pixels a, b, c and d are located along a single scan line. In the example illustrated, pixels c and d are separated from pixels a and b by two pixels because dual interleaved memory controllers are utilized. It will be understood that the pixels in the 4×1 tile configuration may be separated by more or fewer pixels than illustrated in FIG. 9B, or may be consecutive, depending on the configuration of the memory controller. The 2×2 tile configuration is utilized for primitives having a relatively small dimension along the scan line, whereas the 4×1 tile configuration is utilized for primitives having a relatively large dimension along the scan line. The dimension of the primitive is determined in the pixel generator 100 (FIG. 3), and a control signal (long mode) is provided to the Z value processor 102. In one example, the 4×1 tile configuration is selected for primitives having a dimension of more than 128 pixels along the scan line. It will be understood that different criteria can be utilized for selecting different tile configurations. Furthermore, a variety of different tile configurations may be utilized and more than two tile configurations may be made available for selection.

The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Verilog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits.

While there have been shown and described what are at present considered the preferred embodiments of the present invention, it will be obvious to those skilled in the art that various changes and modifications may be made therein without departing from the scope of the invention as defined by the appended claims.

What is claimed is:
1. Apparatus for updating Z values corresponding to pixels of a computer graphics display, comprising:
 a memory for storing current Z values representing depths at corresponding pixel locations;
 a Z cache for storing a subset of said current Z values which are stored in said memory said Z cache including a predetermined number of cache entries and an ID representative of a memory address corresponding to each detried each of said cache entries and cache entries having locations for storing a tile of said current Z values, said tile comprising Z values corresponding to pixels having a predefined relationship;
 a comparator for comparing a new Z value with a corresponding current Z value and for indicating a pass when said new Z value satisfies a predetermined criteria, wherein said new Z value and said current Z value each comprise an H byte an M byte and an L byte and wherein said Z cache comprises an H byte cache, an M byte cache and an L byte cache, each of said data entries in said Z cache comprising one entry in each of said H byte, M byte and L byte caches, and wherein said comparator comprises an H byte comparator, an M byte comparator and an L byte comparator; and
 control logic responsive to a new Z address corresponding to said new Z value for reading said current Z value from said Z cache when said current Z value is stored in said Z cache, for reading said current Z value from said memory when said current Z value is not stored in said Z cache, for supplying said new and current Z values to said comparator and for writing said new Z value to said Z cache in response to said comparator indicating a pass, said control logic including means for reading H bytes of said tile from said memory when said current Z value is not stored in said Z cache, and for reading M bytes and L bytes of said tile from said memory only when necessary for completion of the comparison between said new Z value and said current Z value.

2. Apparatus as defined in claim 1, wherein said control logic includes logic for selecting a tile configuration from a group of two or more tile configurations.

3. Apparatus as defined in claim 2, wherein said means for selecting a tile configuration includes means for selecting a 4×1 tile configuration, wherein four pixels of the tile are located along a single scan line of the computer graphics display, or a 2×2 tile configuration, wherein two consecutive pixels are located along two consecutive scan lines of the computer graphics display.

4. Apparatus as defined in claim 1, wherein said tile contains Z values corresponding to four pixels of the computer graphics display.

5. Apparatus as defined in claim 1, wherein said Z cache comprises eight of said cache entries.

6. Apparatus as defined in claim 1, wherein said Z cache further includes a status field associated with each of said cache entries, said status field comprising a read valid subfield that indicates when Z values have been loaded from said memory, a write valid subfield that indicates when new Z values have been loaded into the Z cache, and an update subfield that indicates when one or more of the Z values in the tile of the corresponding cache entry have been updated.

7. Apparatus as defined in claim 1, wherein said control logic includes means for controlling comparison of said new Z value with said current Z value by said comparator, such that comparison of the M bytes is required only when the H bytes are equal and comparison of the L bytes is required only when the H bytes are equal and the M bytes are equal.

8. Apparatus as defined in claim 1, wherein said memory is divided into pages, and wherein said control logic includes means for flushing said Z cache when said new Z value corresponds to a different memory page from a previous new Z value, said means for flushing comprising means for writing Z values stored in said Z cache to corresponding locations in said memory.

9. Apparatus as defined in claim 1, wherein said control logic includes means for writing a selected cache entry from said Z cache to said memory before writing said new Z value into said Z cache when said Z cache is full.

10. Apparatus as defined in claim 1, wherein said control logic includes means for writing said new Z value and other bytes of said tile read from said memory but not selected for comparison into said Z cache when said current Z value is not stored in said Z cache and said comparator indicates a pass.

11. Apparatus as defined in claim 1, wherein said control logic includes means for writing the bytes of said tile read from said memory into said Z cache when said current Z value is not stored in said Z cache and said comparator does not indicate a pass.

12. In a computer graphics system comprising a memory for storing current Z values representing depths at corresponding pixel locations and a comparator for comparing a new Z value with a corresponding current Z value, a method for updating Z values, comprising the steps of:

providing a Z cache for storing a subset of said current Z values which are stored in said memory, said Z cache including a predetermined number of cache entries, each of said cache entries having locations for storing a tile of said current values, said tile comprising Z values corresponding to pixels having a predefined relationship;

reading said current Z value from said Z cache when said current Z value is stored in said Z cache;

reading said current Z value from said memory when said current Z value is not stored in said Z cache;

supplying said new Z value and said current Z value to said comparator;

said comparator comparing said new Z value with said current Z value and indicating a pass when said new Z value satisfies a predetermined criteria, wherein said new Z value and said current Z value each comprise an H byte, an M byte and an L byte and wherein the step of comparing said new value with said current Z value includes comparing the H byte of said new Z value with the H byte of said current Z value such that comparison of the M bytes is required only when the H bytes are equal and comparison of the L bytes is required only when the H bytes are equal and the M bytes are equal; and writing said new Z value to said Z cache in response to said comparator indicating a passe wherein the step of reading said current Z value from said memory includes reading H bytes of said tile from said memory when said current Z value is not stored in said cache, and reading M bytes and L bytes of said tile from said memory only when necessary for completion of the comparison between said new Z value and said current Z value.

13. A method as defined in claim 12 further including the step of selecting a tile configuration from a group of two or more tile configurations.

14. A method as defined in claim 12 wherein the step of writing said new Z value to said Z cache includes writing said new Z value and other bytes of said tile read from said memory but not selected for comparison into said Z cache when said current Z value is not stored in said Z cache and said comparator indicates a pass.

15. A method as defined in claim 12 further including the step of writing the bytes of said tile read from said memory into said Z cache when said current Z value is not stored in said Z cache and said comparator does not indicate a pass.

* * * * *

UNITED STATES PATENT AND TRADEMARK OFFICE
CERTIFICATE OF CORRECTION

PATENT NO.    : 5,760,780
DATED         : June 2, 1998
INVENTOR(S)   : Larson et al.

It is certified that error appears in the above-identified patent and that said Letters Patent is hereby corrected as shown below:

Column 13, Line 59:   delete detried each (USPTO error)

Column 13, Line 59:   --entries and-- should read "entries, each of said" (USPTO error)

Signed and Sealed this

Fifteenth Day of May, 2001

Attest:

NICHOLAS P. GODICI

Attesting Officer    Acting Director of the United States Patent and Trademark Office